US006233202B1

(12) United States Patent
McDonald et al.

(10) Patent No.: US 6,233,202 B1
(45) **Date of Patent: *May 15, 2001**

(54) DIPPING SONAR TRANSDUCER HOUSING

(75) Inventors: Larry R. McDonald, Valencia; Stanley Secretan, Leona Valley, both of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 06/758,909

(22) Filed: Jul. 25, 1985

(51) Int. Cl.[7] ...................................................... H04B 1/59

(52) U.S. Cl. .................................. 367/5; 367/6; 367/153; 181/110

(58) Field of Search .................................... 114/253, 317, 114/319, 320, 322; 181/101, 108, 109, 110, 111, 112, 123, 124; 367/1, 2, 3, 4, 5, 6, 106, 117, 129, 130, 141, 154, 153, 171, 155, 173, 176, 188, 910; 340/850; 441/33

(56) References Cited

U.S. PATENT DOCUMENTS 3,886,491 * 5/1975 Jonkey et al. ....................... 367/153

* cited by examiner

*Primary Examiner*—Harold J. Tudor
(74) *Attorney, Agent, or Firm*—Loria B. Yeadon

(57) ABSTRACT

A dipping sonar transducer housing includes a generally cylindrical housing (10) which is suspended at the end of a cable (12) connected to tile housing through a vibration isolation module (14) which includes springs (22) to damp out noise, particularly that from the supporting vehicle. The housing (10) contains an upper water-tight chamber (26) which contains circuit boards (28) and preamplifiers (30) which serve as amplification and multiplexing means for the hydrophones carried on extendible arms (96, 60, 88); a second water-tight chamber (35) immediately below the first chamber (26) contains an electric motor (36) which drives a hydraulic pump (38) which provides fluid under pressure to an accumulator (40). Movable vertically on the outside of the second chamber (35) is a piston (48) which drives a plurality of links (54, 56) which extend the receiver array. Located in a third water-tight chamber (62) are electronic and electrical components (64, 66) connected to control operation of the projector transducers (78). A reel or drum (82) is rotatable by means of a hydraulic motor contained within the drum (82) to lower and raise the projectors (78). The drum (82), projectors (78) and interconnecting cables (80) are all carried within a chamber (76) which is free-flooding and surrounding this chamber is a sealed annular chamber (74) which contains a plurality of batteries (72) providing a power source for the electric motor (36) and the projector transducers (78).

15 Claims, 2 Drawing Sheets

DIPPING SONAR TRANSDUCER HOUSING

This invention relates to dipping sonar systems and more particularly to a compact and efficient transducer housing assembly for a dipping sonar.

In the usual dipping sonar the transmitting or projector transducers and receiving transducers are contained in a unit which is suspended from the helicopter at the end of a cable with the transmitting and receiving transducers permanently fixed to the suspended unit. For some applications it is desired to create a system operating at a lower frequency, in which case the inherent geometry dictates a much larger array. Such large, low frequency sonars have been limited to ship-based or shore-based systems, but recently it has been considered desirable to provide a lower frequency sonar for airborne use.

To provide a transducer for airborne sonar capable of operating at significantly lower frequencies than those presently employed, applicant has devised a system including a radially deployable array of hydrophones and an array of disk-shaped sonar transmitting transducers or projectors which is carried in a very compact assembly in a submersible housing and which is deployed to create a vertical array of considerable length. This projector system includes a series of electrically interconnected transmitter projectors tethered together by means of small diameter cables which are anchored to the bottom or lower projector unit. A powered drum in the housing unwinds the cables to permit the projectors to drop away from the housing and winds the cables in to return the projectors to their stored position. This projector deployment system is described and claimed in copending application Ser. No. 717,199 (common assignee) now U.S. Pat. No. 4,725,988.

A powered piston is movable to positively drive the receiver array to its open or extended position and is also movable to positively drive the receiver array to a position where it is folded against the housing. A stack of amplifier and analog to digital converter circuit boards for the receiver array are located in a first water-tight chamber at the top of the housing where they are connected to the suspending cable and to a series of preamplifier units which, in turn, are connected through feed-through connectors in the wall of the housing to the hydrophone array. To minimize the effect of noise traveling down the cable, it is connected to the housing through a vibration isolation unit.

Located in a second water-tight chamber of the housing just below the housing containing the amplifier and the analog-to-digital convertor circuit boards are an electric motor, a hydraulic pump and an accumulator, the hydraulic pump being driven by the electric motor. Hydraulic connections from the accumulator and pump provide fluid to operate the drum which deploys the projectors and the powered piston which deploys and secures the hydrophone array.

An additional water-tight chamber contains the electronic components which power the projectors, which components are sealed from both a free-flooding chamber containing the projectors and from a sealed battery chamber surrounding the projector chamber.

The invention is described in greater detail in the following specification and the drawings in which.

Figure 1:
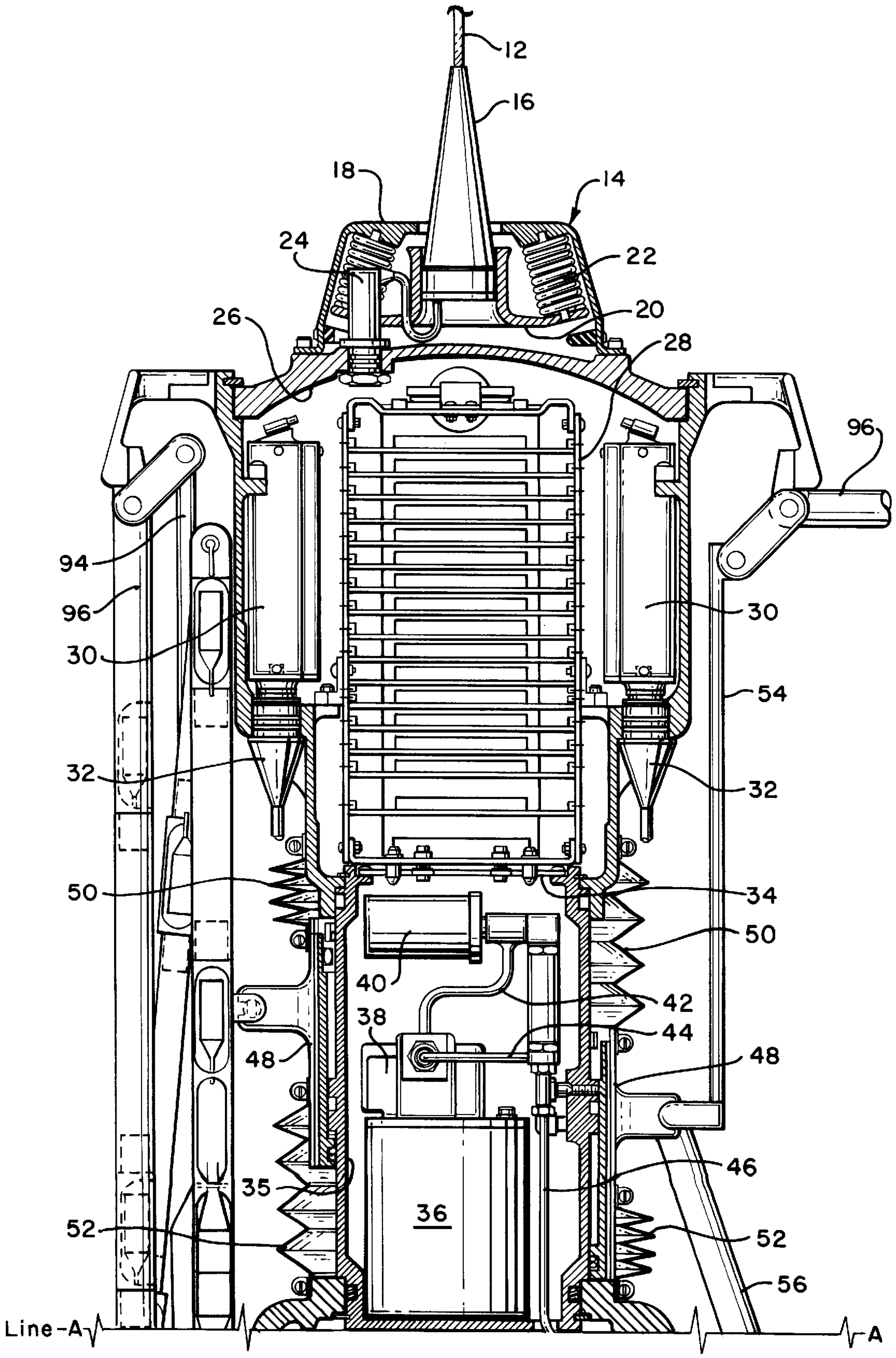
FIG. 1 is a cross-sectional view of the upper part of a dipping sonar transducer housing according to my invention.
Figure 2:
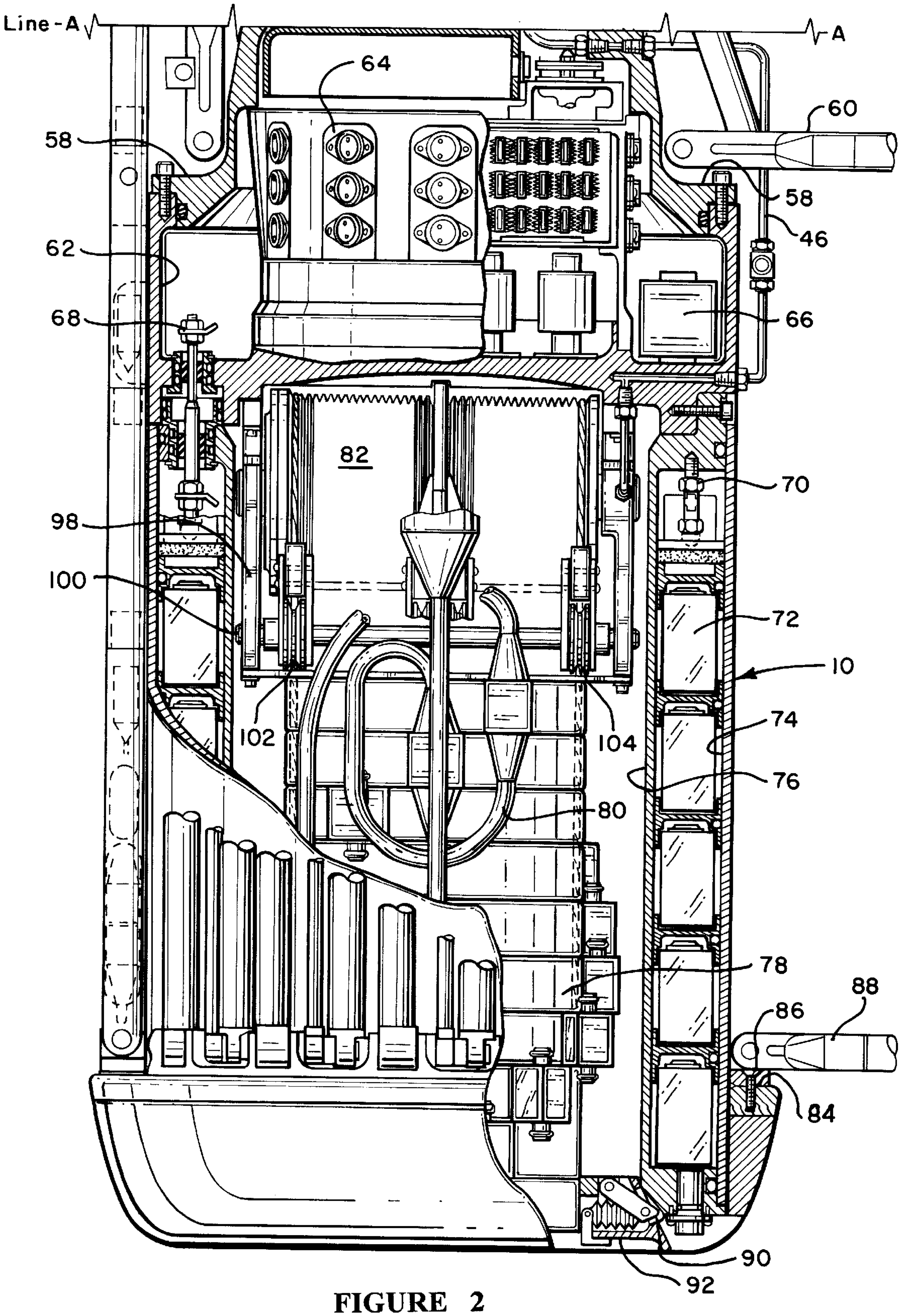
FIG. 2 is a cross-sectional view of the lower part of the dipping sonar housing of FIG. 1.

Referring now to the drawings, the housing generally is shown at numeral 10. It is suspended from an aircraft or a ship on a cable 12 which feeds through a vibration isolation module 14 including a conical termination number 16 which is preferably of rubber or a similar elastomeric material and which prevents cable 12 from abraiding where it enters the cover 18 of the module 14. Attached to member 16 is a cylindrical support member 20 having a radially extending flange. A plurality of springs 22 are fastened between cover 18 and the flange of member 20. The strength member of cable 12 is terminated at member 20 and the signal and power wires are continued, with no mechanical loading, through a feed-through connector 24 into the interior of a sealed chamber 26 at the top of housing 10. Wires passing through connector 24 are supplied to a stack of printed circuit boards 28 which amplify and digitize the hydrophone signals which are multiplexed and then sent up cable 12 to the processing and display equipment in the supporting craft. A plurality of preamplifiers 30 are also shown in chamber 26 which are connected to a group of feed-through connectors 32 which receive input signals from the hydrophone array, discussed below.

At the bottom of chamber 26 which contains the printed circuit board stack 28 is a partition 34 which separates chamber 26 from a second sealed chamber 35. Chamber 35 contains an electric motor 36 which drives the hydraulic pump 38. This pump, in turn, provides hydraulic pressure to a hydraulic accumulator 40. A number of interconnected hydraulic lines 42, 44 and 46 connect the hydraulic motor 38 and accumulator 40 to various parts of the system for which hydraulic power is required. Axially movable on the outside of chamber 35 is a piston 48 which is shown on the right side of the drawing in its maximum downward position and on the left side of the drawing in its maximum upward position. In actuality the piston must, of course, have a single position at any one time. At the top end of piston 48 and surrounding chamber 35 is a bellows member 50 which is sealed to the piston at its lower end and to the wall of the housing 10 at its upper end. Similarly, at the lower end of piston 48 is a bellows member 52 which is sealed to the piston at its upper end and to the housing 10 at its lower end. Through control means not a part of this invention hydraulic power is selectively connected to chambers within bellows 50 or 52 on opposite ends of piston 48 to drive the piston upwardly or downwardly as desired to operate pushrods 54 and 56 to extend the array of receiving hydrophones.

Below the bellows 52 the housing 10 expands in diameter and forms a ledge 58 on which is located a number of supports for a plurality of radially extending hydrophone arms 60. Positioned within this expanded portion of the housing is an additional sealed chamber 62 which contains electronic components including circuitry for the projector section including a number of banks of transistors 64 and magnetic components including a number of inductors and transformers 66. Electrical connecting means (not shown) are also connected to a plurality of feed-through connectors 68 which carry power to the projectors and to other connectors 70 which carry wires for charging a number of batteries 72 in a separate sealed battery chamber 74.

Within the hollow interior of battery chamber 74 is a free-flooding chamber 76 which contains a stack of flat cylindrical projector transducer members 78 along with all their interconnecting cables 80, a rotatable drum or reel 82 which is powered by means of a hydraulic motor carried within itself and which is not visible in this view. This hydraulic motor receives power through conduit 46 from the hydraulic pump 38 and accumulator 40. While drum 82 is described as operated by a hydraulic motor, it could also be driven by an electric motor.

At the lower end of housing 10 is a ledge 84 which carries a plurality of support members and pivot structures 86 to which are attached the receiver array arms 88. The lower one of transducers 78 sits in a retaining ring 90 having a frusto-conical edge surface which mates with the corresponding surface at the lower inside edge of the battery housing 74. A pressure responsive latch means secures member 90 to the inside edge of housing 74 until the housing reaches a desired depth at which time the pressure responsive means is compressed sufficiently to release the latch and permit member 92 to drop away from the housing carrying with it the projectors 78.

In this view the hydrophone array on the right side is shown extended (cut away) and on the left side it is shown folded against the housing 10. A pushrod 94 which directly corresponds to pushrod 54 is shown having moved the upper of the hydrophone arms 96 to a position where it lies vertically along the side of the housing 10.

Fastened to a support structure 98 which carries drum 82 is a shaft 100 on which is carried a pair of small sheaves 102 and 104. Across these sheaves are fed some small but very strong cables that are in turn passed through small ports on the edges of all of the transducer projectors 78 and which are then attached to the bottom retainer plate 90 such that when the drum or reel 82 is actuated to lower plate 90 these wires or cables move downwardly with plate 90 until the array is fully extended. When it is decided to return the housing 10 to the support vehicle the drum 82 is actuated and as it turns it winds these small cables over the sheaves 102, 104 onto itself and raising the projectors 78 until they are restacked in the housing as shown.

Modifications may become apparent to those skilled in the art. For example, the hydraulic system which is used to extend the hydrophone array and to retract it may be replaced with an electric motor as well as the hydraulic motor which drives drum 82. Because of potential damage from the batteries 72 over time, it is important that they be carefully sealed off from the electronics in housing 62. Obviously the arrangement of electronic components such as the transistor stack 64 and the circuit board stack 28 will admit of many possible variations. And while the latch mechanism 92 for releasing the bottom plate 90 is shown as a bellows-operated device responsive to the ambient water pressure at a certain depth, this release mechanism could also be accomplished through other means as by solenoid-operated latches. Other modifications will become apparent to those skilled in the art.

What is claimed is:

1. A dipping sonar adapted to be suspended from a vehicle into a body of water at the end of a cable including a housing attached to said cable, vibration isolation means at the top of said housing and connected between said cable and said housing, an array of receiving transducers operatively connected to said housing and an array of transmitting sonar projectors operatively connected to said housing:

characterized in that said housing is generally in the form of an elongated cylinder including mounting means on its exterior for supporting said array of receiving transducers, a first water-tight chamber at the top of said housing, and a plurality of electronic amplification means in said chamber connected to said cable, a second water-tight chamber in said housing below said first chamber, drive means including an electric motor in said second chamber, an axially movable drive piston positioned externally of said housing and means connecting said drive means to drive said piston, said piston being connected to said array of receiving transducers, a third water-tight chamber in said housing below said second chamber and electronic and magnetic components in said third chamber connected to said sonar projectors, a fourth free flooding chamber in said housing located below said third chamber and containing said sonar projectors and interconnections between said projectors, a hoist for lowering said projectors away from said housing into the water and for raising them and stacking them in said fourth chamber and motor means for driving said hoist, and a fifth water-tight chamber in said housing located between the lower exterior wall of said chamber and a cylindrical wall of said fourth chamber and a plurality of batteries in said fifth chamber and electrical connections between said cable and said batteries.

2. A dipping sonar as claimed in claim 1 wherein said drive means further includes a hydraulic pump and an accumulator and hydraulic conduits connected from said pump and accumulator to opposite sides of said piston.

3. A dipping sonar as claimed in claim 2 wherein oil filled bellows are provided which are sealed to opposite sides of said piston and to the said housing.

4. A dipping sonar as claimed in claim 2 wherein said motor means for driving said hoist is a hydraulic motor and hydraulic lines are connected between said hydraulic pump and accumulator and said hydraulic motor.

5. A dipping sonar as claimed in claim 1 wherein a closure plate is positioned at the lower end of said fourth chamber, said plate including a frusto-conical edge adapted to contact the lower edge of the cylindrical wall of said fourth chamber, and pressure responsive latch means are included for securing said closure plate to said lower edge.

6. A dipping sonar as claimed in claim 1 wherein said amplification means includes a plurality of preamplifier assemblies around the periphery of said first chamber and a plurality of electrical feed through connectors for connecting said receiving transducer array to said preamplifier assemblies through the wall of said housing.

7. A dipping sonar adapted to be suspended from a vehicle into a body of water at the end of a cable including a housing attached to said cable, vibration isolation means at the top of said housing and connector between said cable and said housing, an array of receiving transducers operatively connected to said housing and an array of transmitting sonar projectors operatively connected to said housing:

characterized in that said housing is generally in the form of an elongated cylinder including mounting means on its exterior for supporting said array of receiving transducers, a first water-tight chamber at the top of said housing, and a plurality of electronic amplification means in said chamber, a second water-tight chamber in said housing below said first chamber, an electric motor and hydraulic drive means connected to said electric motor in said second chamber, an axially movable drive piston, positioned externally of said housing and hydraulic conduits connected to opposite sides of said piston and to said hydraulic drive means, said piston being connected to said array of receiving transducers, a third water-tight chamber in said housing below said second chamber and electronic and magnetic components in said third chamber connected to said sonar projectors, a fourth free flooding chamber in said housing located below said third chamber and containing said sonar projectors and interconnections between said projectors, a hoist for lowering said projectors away from said housing into the water and for raising them and stacking them in said fourth chamber, and motor means for driving said hoist, and a fifth water-tight chamber in said housing located between the lower exterior wall of said chamber and a cylindrical wall of said fourth chamber and a plurality of batteries in said fifth chamber and electrical connections between said cable and said batteries.

8. A dipping sonar as claimed in claim 7 wherein oil filled bellows are provided which are sealed to opposite sides of said piston and to the said housing.

9. A dipping sonar as claimed in claim 7 wherein a closure plate is positioned at the lower end of said fourth chamber, said plate including a frusto-conical edge adapted to contact the lower edge of the cylindrical wall of said fourth chamber, and pressure responsive latch means are included for securing said closure plate to said lower edge.

10. A dipping sonar as claimed in claim 7 wherein said amplification means includes a plurality of preamplifier assemblies around the periphery of said first chamber and a plurality of electrical teed through connectors for connecting said receiving transducer array to said preamplifier assemblies through the wall of said housing.

11. A dipping sonar which is suspended from a vehicle in a liquid medium at the end of a cable including a housing attached to the cable, vibration isolation means at the top end of said housing including resilient means for attenuating noise travelling down said cable from said vehicle, an array of receiving transducers operatively connected to said housing and an array of sonar projectors operatively connected to said housing:

characterized in that said housing is generally in the form of an elongated cylinder having externally at its top end a plurality of mounting means for supporting said receiving transducer array, a first chamber at the top of said housing, a plurality of electronic amplifier means in said chamber and a plurality of feed through electrical connectors for connecting said receiving transducer array to said amplifier means, and coupling means connecting said amplifier means to said cable;

a second chamber in said housing below said first chamber, an electric motor and hydraulic drive means connected to said electric motor in said second chamber, an axially movable drive piston externally of said housing, oil filled bellows means fastened to said piston and to said housing on each side of said piston and fluid conduits connecting said hydraulic drive means to opposite sides of said drive piston, link means attached to said drive piston and to said receiving transducer array, a third chamber in said housing and electrical power supply means, transmitter electronics, and magnetic members in said chamber, a fourth chamber in said housing which is free flooding, said fourth chamber containing said array of sonar projectors and interconnections between said projectors, and a hoist for releasing and retrieving said projectors, hydraulic motor means for driving said hoist, a fifth chamber in said housing located between the lower exterior wall of said housing and a cylindrical wall of said fourth chamber, a plurality of batteries and capacitors in said fifth chamber, sealed feed through connectors between said third and fifth chambers, and fluid conduits connecting said hydraulic motor means to said hydraulic drive means.

12. A dipping sonar as claimed in claim 11 wherein said amplifying means includes a plurality of preamplifier assemblies electrically connected to said feed through electrical connectors and a plurality of circuit board assemblies connected to said preamplifier assemblies including amplification and analog to digital converting means.

13. A dipping sonar as claimed in claim 11 wherein additional mounting means for supporting said receiving transducer array are located externally of said housing at its lower end.

14. A dipping sonar as claimed in claim 11 wherein said second chamber is liquid-tight and includes a hydraulic accumulator connected to said hydraulic drive means.

15. A dipping sonar as claimed in claim 11 wherein said fifth chamber is liquid-tight and said batteries are connected to said electrical cable so that said batteries can be charged continuously between transmitting cycles.

* * * * *